Jan. 19, 1954

R. L. SMITH 2,666,536

SORTER CONTROL DEVICE

Filed Feb. 11, 1950

INVENTOR.
Robert L. Smith
BY
Arnold and Mathis
ATTORNEYS

Jan. 19, 1954    R. L. SMITH    2,666,536
SORTER CONTROL DEVICE
Filed Feb. 11, 1950    3 Sheets-Sheet 3

INVENTOR.
ROBERT L. SMITH
BY
Arnold and Mathis
ATTORNEYS

Patented Jan. 19, 1954

2,666,536

UNITED STATES PATENT OFFICE 2,666,536

SORTER CONTROL DEVICE

Robert L. Smith, Tacoma, Wash., assignor to Plywood Research Foundation, Tacoma, Wash., a corporation of Washington Application February 11, 1950, Serial No. 143,700

3 Claims. (Cl. 214—11)

The present invention relates to a sorter control device. More particularly, the present invention relates to a device for controlling the sorting mechanism whereby pieces of predetermined size cut from travelling sheet material are selectively removed from an offbearing conveyor associated with the means employed in cutting the pieces, particularly with a knife employed in clipping wood veneers in the plywood art.

In making plywood, it is the present practice to pass the travelling sheets of wood veneer coming from the lathe through a clipper which cuts the sheets transversely into strips. The clipper is controlled by a skilled operator who appraises the travelling sheet as it enters the clipper on the infeed conveyor and cuts the sheet in a manner calculated to secure optimum utilization of its content. Thus the sheets may be cut to eliminate unusable portions such as those containing numerous or large knot holes, pitch pockets and decayed and slivered areas. The usable portions which remain then may be cut to size as required by the subsequent manufacturing operation. Usable sizes might comprise, for example, those between 8 and 16 inches, 16 and 30 inches, 30 and 40 inches, and 40 and 52 inches. Each of these sizes may be subdivided further into heart stock and sap stock.

To make possible such an operation, the infeed conveyor of the clipper may be provided with a trip chain as illustrated, for example, in the patent to Haumann, U. S. 2,005,824, which is assigned to the Coe Manufacturing Company. The trip chain moves synchronously with the infeed conveyor. It carries at spaced intervals (e. g. 2 inch centers) a plurality of dogs or, in the currently manufactured form, index pins slidingly mounted in housings carried by the chains. As the veneer and the trip chain pass together in front of the operator, he sets the dogs or index pins opposite the points on the veneer where he wishes cuts to be made. Upon further progression toward the clipper, the adjusted dogs or index pins engage a cam bar or other mechanism having for its function the actuation of the clipper knife, which thereupon makes a cut in the desired place.

The cut pieces then are carried on an outfeed or offbearing conveyor of substantial length. Stationed along this conveyor are a group of workmen whose task it is to sort out manually the cut pieces of selected size and quality and to transfer them to bins, the discarded material passing over the end of the conveyor to scrap. This arrangement has the serious disadvantage of requiring a substantial amount of labor. It also places the responsibility of sorting the cut pieces upon a group of workmen who may or may not be skilled in grading wood veneers. If this group lacks the requisite skill, the careful selection made by the skilled operator of the clipper obviously is wasted, since the pieces cut in accordance with his judgment may or may not be transferred to the correct storage bin. Hence it would be highly desirable to provide means associated with the knife-actuating means of the trip chain which, after a suitable time delay, will operate to transfer automatically the clipped pieces of veneer to their respective storage bins.

A suitable type of sorting and transfer apparatus for accomplishing such a transfer is disclosed in the patent application of Harold R. Evans and Dale L. Schubert, Serial No. 770,540, now U. S. Patent 2,497,874, the mechanism being illustrated in connection with the veneer clipper of the Miller patent, U. S. 2,394,558. A control device whereby the Evans et al. sorting mechanism may be actuated by the operator of the clipper at the time of determining the points at which the cuts are to be made is set forth in the patent application of Dale L. Schubert, Serial No. 33,050. In the latter patent application, the control device is disclosed and illustrated with reference to the clipper of the Robinson Patent U. S. 1,753,967 as well as that of the aforementioned Haumann patent, U. S. 2,005,824.

In the control device of the Schubert patent application, there are provided a plurality of electric switches attached to the frame of the infeed conveyor at spaced intervals corresponding to the spacing between the dogs or index fingers (Nos. 29 to 55, inclusive) on the trip chain. On each of the switches is a finger or switch-operating lever 57 adapted to contact any dog or index finger on the trip chain which has been adjusted to knife actuating position. This actuates a time delay mechanism in such a manner that an element of the sorting mechanism stationed along the offbearing conveyor operates to remove the particular piece of veneer which has been cut as a result of setting the particular dog or index finger actuating the sorting element.

The control device disclosed in the present application is an improved modification of that disclosed in the Schubert patent application, Serial No. 33,050, in that the multiplicity of switches employed in the embodiment of the latter application is replaced with a stepper switch, i. e., a switch having therein a plurality of contact points and a contact arm adapted to be moved by successive electric impulses stepwise from one contact point to the next. This specific construction has the important advantage of accomplishing the desired automatic control of the sorter mechanism by means of a device which is simple in construction, inexpensive, and reliable in operation, since there are few working parts which may get out of order.

The construction and manner of operation of the control device of the present invention will be apparent from the accompanying specification and claims considered together with the drawings wherein:

Figure 2 is a schematic illustration similar to Figure 1 but illustrating the control device of the present invention in another embodiment;

Figure 1:
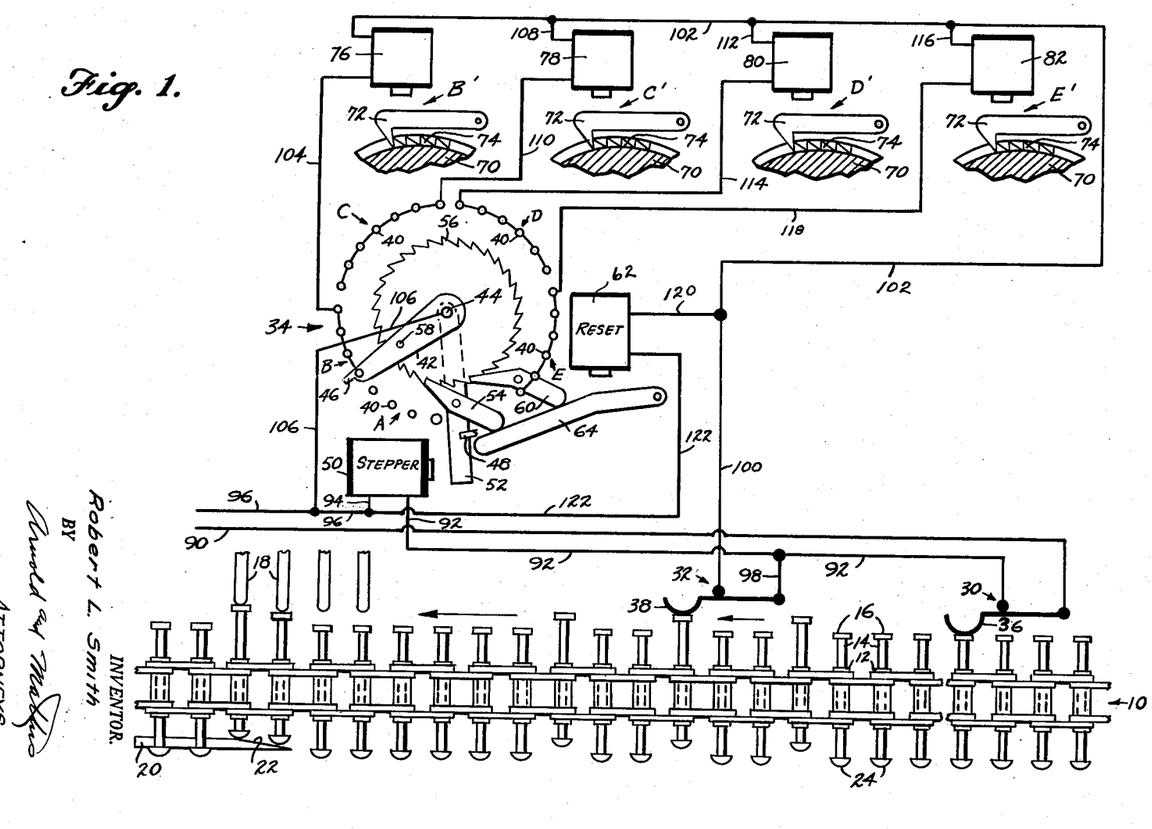
Figure 1 is a schematic view of the control device of the present invention as applied to a Coe clipper of current design.

In the drawings, see particularly Fig. 1, the trip chain of a veneer clipper is indicated generally at 10. As explained above, this chain moves synchronously with the infeed conveyor and is adapted to actuate the knife of the clipper. The chain is provided at spaced intervals, e. g., two-inch centers, with sleeves 12 in which are mounted slidably the index fingers 14. The index fingers are adapted to be adjusted inwardly and have at their inner extremities feet 16 for contacting cam bars 18. The latter correspond to cam bars 67 in Figure 7 of the aforesaid Haumann Patent U. S. 2,005,824 and have for their function the actuation of the clipper knife.

Contact between the index fingers and the cam bars 18 is caused by means of the member 20 having a cam surface 22 which is adapted to engage the curved surfaces of the heads 24 of those index fingers which have been adjusted inwardly, thereby further displacing them until they are in operative engagement with the cam bars 18. It will be apparent that such engagement is had only when the index fingers have been adjusted inwardly into operative position, the member 20 being so dimensioned that it passes beneath the flat, under surfaces of those index pins which have not been adjusted and which, therefore, are in inoperative position. After having actuated the clipper knife, the index pins which have been adjusted to operative position are returned to inoperative position automatically by suitable means, such as a conventional wiper bar (not shown). The index pins selected for illustration herein thus are the full equivalent of such knife actuating means as the lugs 65 illustrated particularly in Figure 5 of the Haumann Patent 2,005,824, referred to above.

The index pins 14 also contact electric switches 30 and 32 as they pass in front of the operator in synchronism with the infeed conveyor. These switches are mounted at suitable stations on the frame of the clipper and are associated with stepper switch means 34. Switches 30 and 32 are of the class of switches having pivotally mounted arms 36 and 38, respectively, adapted to contact the index pins and to close the switches of which they are component parts with each such contact. Switch 30 is arranged to contact each of the pins as it passes the switch station. Switch 32 is arranged, however, so that the arm 38 thereof will contact only those pins which have been adjusted inwardly to operative position.

The stepper switch means 34 with which the switches 30 and 32 are associated may be of any suitable construction wherein a contact arm is advanced stepwise along a series of contact points upon the reception of periodic electric impulses. In the illustrated form, the stepper switch comprises a plurality of contact points 40 arranged in groups indicated generally by the letters A, B, C, D, and E, the contact members of groups B, C, D, and E being banded together in separate electric circuits. There is one contact point for each of the index pins on the trip chain and, just as the pins correspond to 2-inch spacings on the veneer, so the contact points represent similar spacings. Thus the contact points of group A correspond to veneer widths up to eight inches; those of group B to veneer widths of between 8 and 16 inches; those of group C to veneer widths of between 16 and 30 inches; those of group D to veneer widths of between 30 and 40 inches; and those of group E to veneer widths of between 40 and 52 inches.

A contact arm 42 is rotatably mounted on pin 44 and has at the extremity thereof a finger 46 adapted to contact stop 48. The contact arm moves stepwise from contact point to contact point upon periodic energization of the stepper relay 50. This moves arm 52 with each impulse, thereby advancing the contact arm 42 one contact point for each impulse through the agency of the pawl 54. The latter is adapted to engage notched wheel 56 to which the contact arm 42 is attached by means of pin 58. The notched wheel 56 and the contact arm 42 which it carries thus are rotated in clockwise direction as viewed in the drawing, this rotation being accomplished against the tension of a torsion spring (not shown) and the contact arm being maintained at each stage of its stepwise advancement by means of the restraining pawl 60.

Release of the contact arm 42 and its return to its original or zero position with the finger 46 against the stop 48 is accomplished upon energization of the reset relay 62. This actuates the release arm 64 which is in operative engagement with the shank portions of the pawls 54, 60. Upon actuation of the release arm, these pawls will be moved out of contact with the notches in notched wheel 56 which, together with the attached contact arm 42, will be returned by the torsion spring to its original or zero position. It is to be understood, however, that such a stepper switch construction is conventional and forms no part of the present invention except insofar as it cooperates with the other elements thereof in providing a control device of the type disclosed herein. It is further to be understood that the particular stepper switch described is illustrative only, there being available others having constructions which, for the purposes of the present invention, are the full equivalents of the illustrated stepper switch construction.

Also associated with the stepper switch 34 is the sorting mechanism whereby cut pieces of veneer of selected widths are sorted and transferred to the appropriate bins. In the embodiment illustrated, the sorting mechanism comprises four elements and therefore is adapted to sort the cut veneers according to width into four classes. The veneers may be sorted into as many such classes as may be desired, however, by increasing the number of sorting elements comprising the sorting mechanism.

In the drawing, the sorting elements are indicated generally at B', C', D', and E', which are connected in the electric circuit with the contact groups B, C, D, and E, respectively, of the stepper switch. The elements of the sorting mechanism are illustrated in fragmentary, schematic form and correspond to the similar elements illustrated in Figure 4 of the aforesaid patent application of Schubert, Serial No. 33,050. Their construction is set forth in detail in the aforesaid patent of Evans and Schubert, U. S. 2,497,874.

In brief, each of the elements of the sorting mechanism comprises a grooved wheel 70 (103), a catch 72 (107) adapted to ride in the groove, a plurality of lugs 74 (106) and solenoids 76, 78, 80, 82 (72, 74, 76, 78), the parenthetical numbers being the numbers given in the aforesaid patent of Evans and Schubert, U. S. 2,497,874, for the corresponding parts. The operation of the elements of the sorting mechanism is such that when one of the solenoids 76, 78, 80, 82 is energized, it releases the catch 72 associated with it from the lug with which the catch is engaged, thereby initiating the operation of the sorting mechanism element.

Assuming that electrical conductor 90 is connected to the hot side of the current source, electric energy therefrom will be conducted to the switch 30. Each time this switch is closed by contact of the arm 36 with one of the index fingers 14 as they pass by the switch in succession, current will pass through line 92 to the stepper switch relay 50. Since the closing of switch 30 is momentary only during the brief interval that the arm 36 is in contact with the passing index pin, the resulting impulse will cause momentary attraction of the arm 52 toward the solenoid, this motion advancing the contact arm 42 to the next contact unit through the agency of the pawl 54 and the notched wheel 56 to which the contact arm is attached. The electric impulse then leaves the solenoid 50 via line 94, and the return line 96.

The above described action occurs successively as the trip chain 10 moves along synchronously with the veneer on the infeed conveyor and thus advances the contact arm 42 of the stepper switch into contact with successive points as long as the index pins remain in inoperative position. However, when the latter are adjusted inwardly to operative position, i. e., to a position in which they actuate the clipper knife, they also operate to close switch 32 through its arm 38. This will occur contemporaneously with the closing of switch 30 by an inoperative index pin since the two switches are so arranged on the frame of the clipper as to be operable in unison. When it does occur, current flows through line 90, switch 30, line 92, line 98, switch 32, line 100, and thence through line 102. It will then flow through and energize whichever one of solenoids 76, 78, 80, and 82 is connected to the particular group of contact points 40 with which the contact arm 42 is in contact at that particular moment.

Thus if the contact arm is in contact with one of the contact points of group B, as is the case in Figure 1, current will flow through line 102, solenoid 76, line 104, the contact band interconnecting the contacts of group B, the contact arm 42, line 106, and thence to the return line 96. This will actuate the elements B' of the sorting mechanism and the clipped piece will be transferred automatically to the appropriate bin, which, in accordance with the illustrative case presented herein, will be that containing strips having a width of between 8 and 16 inches.

If the contact 42 is in contact with one of the contact points of group C at the time of closing switch 32, then the current will follow lines 102 and 108, solenoid 78, line 110, the band connecting the contact units of group C, contact arm 42, line 106, and thus to return line 96. In this case, the sorting element C' will operate to transfer the piece clipped in response to actuation by the index pin which has closed the switch 32, to the appropriate bin, for example, the bin containing pieces having widths of between 16 and 30 inches.

In the event that the contact arm 42 is in contact with one of the contacts of group D at the time switch 32 is closed by an index pin which has been advanced to operative position, current will follow line 102, line 112, solenoid 80, line 114, the band connecting the contacts of group D, contact arm 42, line 106, and finally return line 96. Thus element D' of the sorting mechanism will be activated, and the cut piece will be transferred automatically to the proper bin, for example the bin containing pieces having widths of between 30 and 42 inches.

If the contact arm is in contact with one of the contacts of group E when switch 32 is closed, then current will follow lines 102, 116, solenoid 82, line 118, the band connecting the contacts of group E, contact arm 42, line 106, and thence to return line 96. In this case, the element E' of the sorting mechanism will be activated and automatically will transfer the clipped piece to the bin of corresponding sizes, i. e., to the bin containing pieces cut to a width of between 42 and 52 inches.

If it should occur that the switch 32 is closed at a time when the contact arm 42 is in contact with one of the contacts of group A, then the sorter control mechanism will not be set in operation, since no corresponding element thereof is connected to the contact units of this group. The particular piece cut upon actuation of the clipper knife in this instance therefore will pass off the end of the conveyor to the scrap pile, its width being in the illustrated case less than 8 inches.

Upon closing the switch 32 and contemporaneously with the energization of one of the elements B', C', D', and E' of the selector mechanism, if such occurs, current passes via line 100, through line 120, solenoid 62, line 122, and finally return line 96. This momentarily energizes the reset solenoid 62, moving release arm 64 in a clockwise direction and releasing pawls 54 and 60 from the notched wheel 56. Moved by the tension of the torsion spring associated therewith, the contact arm 42 returns to its initial position and again starts its stepwise traversal of the contact points upon successive closures of switch 30 by contact of arm 36 with the index pins in inoperative position.

Figure 3:
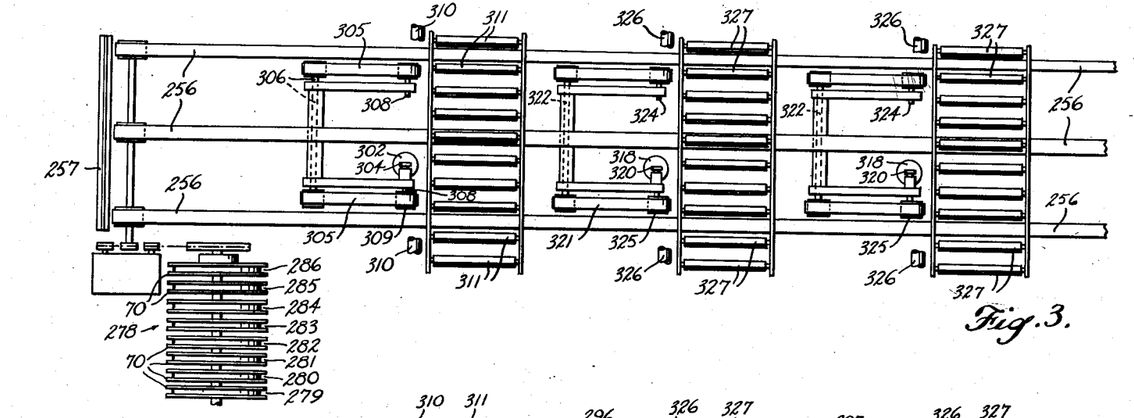
Figure 3 is a fragmentary, diagrammatic plan with parts removed and some broken away in the interest of clearness, of a device illustrating a manner of employing the present invention.
Figure 4:
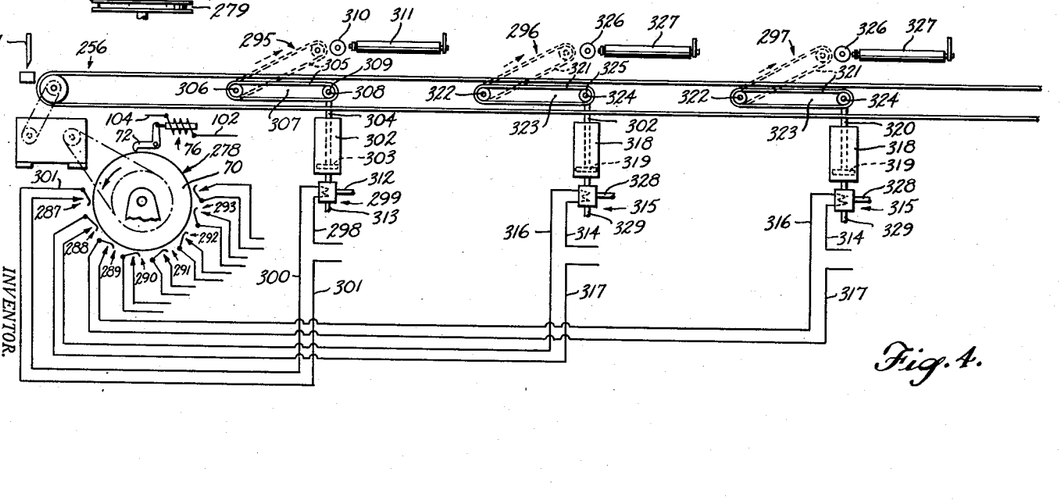
Figure 4 is a fragmentary diagrammatic view in elevation of the apparatus in Fig. 1, and showing a partial wiring diagram.
Figure 6:
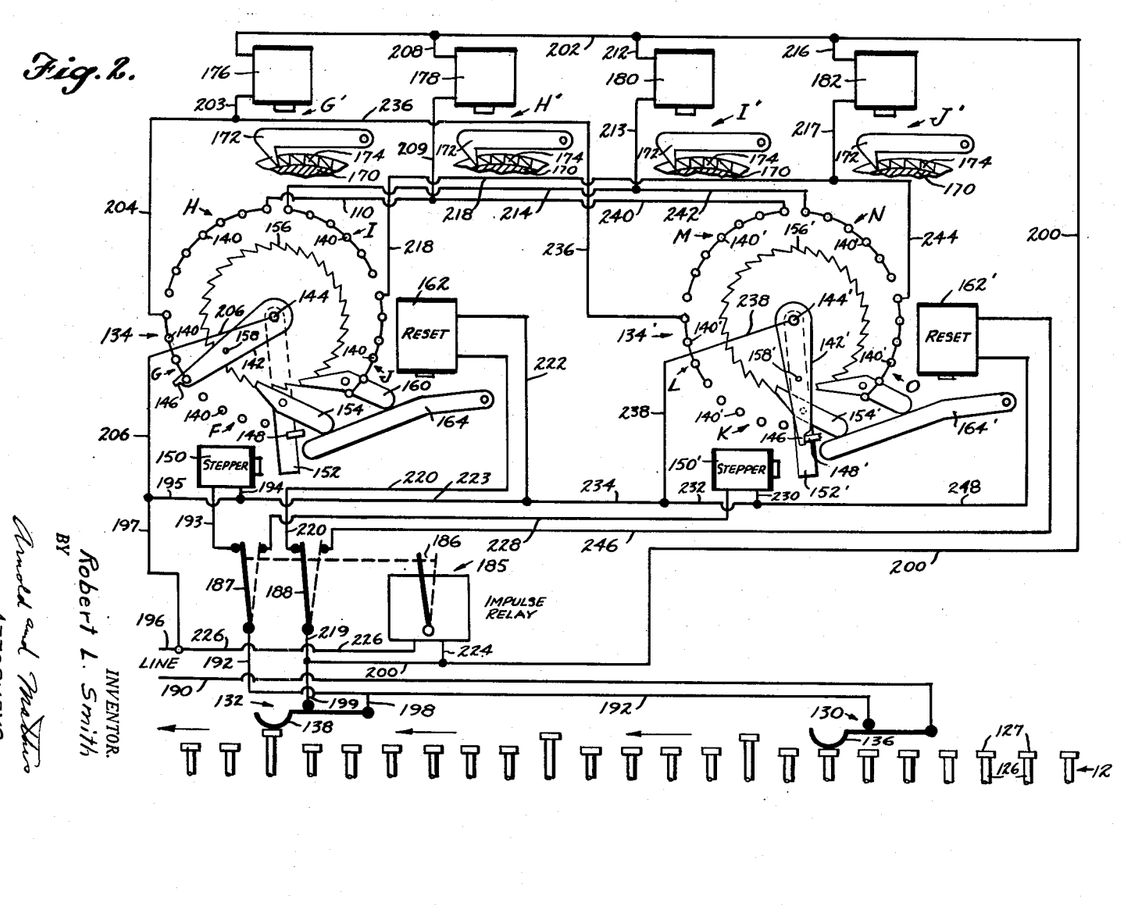

Referring now to Figs. 3 and 4 of the drawings, there will be the same number of grooves in the drum assembly 278 as there will be solenoids of the character 76 and 78, 80 and 82. As four of said solenoids are shown only four of the grooves in the drum assembly 278 need be utilized, said grooves are numbered 279 to 286 inclusive. Each groove 279 to 286 inclusive has a plurality of pawls or lugs 74 therein and the showing of each groove and its pawls will be the same as that fragmentarily illustrated in Fig. 1.

Also, there will be a switch mechanism operable by the pawls in each groove, which switch mechanism is diagrammatically illustrated in Fig. 4. The switch mechanisms for the grooves 279 to 286 inclusive are numbered respectively 287 to 294 inclusive.

The switch means 287 to 294 inclusive are somewhat diagrammatically illustrated by their spacing as far as the periphery of the drum assembly 278 is concerned and will correspond to the spacing of the transfer means controlled by them. There will be one transfer means controlled by each of the switches, but only the transfer means controlled by switches 287, 288, and 289 are shown in Fig. 4, and the others have been broken away. As the peripheral speed of the drum assembly 278 has a direct relation to the lineal speed of the out-bearing belt 256, the space between the catch portion of the catch 72 which is associated with the lugs 74 in the groove 279 and the switch 287 will bear a definite relation to the position of the transfer means 295. The time in which it will take a lug 74 in the groove 279 to travel, after being released, and operate the switch 287 will be the same time as it takes a piece of veneer to travel to the transfer means 295. Thus, as the circuit is closed through one of the groups of contacts B, C, D or E and particularly B for illustration, it will release lugs in groove 279 and at a delayed time afterwards, calculated in relation to the spacing of the transfer means 295 as respects the knife 257, these lugs 74 will operate a switch means 287. Similarly, as lugs 74 are released in the groove 280 by reason of operation of a circuit established through group of contacts C, it will operate switch 288 and the time delay will be the same time delay that is required for veneer stock to travel on the out-bearing belt 256 from the cutter knife 257 to the transfer means 296. Again, when lugs are released in the groove 281, by action of a circuit established through group of contacts D, it will operate switch 289 and at a time delay which is the same as that required for veneer stock to travel on the out-bearing belt 256 to the transfer means 297. The remaining switches 290 to 294 inclusive will have their circuits and will be associated with transfer means similar to transfers 295 to 297 inclusive. The spacing of the switches 290 to 294 inclusive around the periphery of the drum assembly 278 will be such to provide time delay equal to the time delay required to transfer the veneer stock on the out-bearing conveyor 256 to the location of the transfer means associated with said switches. The circuit controlled by the lugs in groove 279 (see Fig. 3) comprises (see Fig. 4) one conductor 298, connected to a source of energy, solenoid controlled valve means 299, conductor 300, switch 287 and conductor 301 connected to the other wire of said source of electrical energy.

Our invention is not limited to a particular type of transfer means and thus transfer means 295 to 297 inclusive are to be considered as illustrative and hence they are somewhat diagrammatically shown. As so shown, an air cylinder 302 is provided with a traveling piston 303. Upon energizing of solenoid in valve means 299, the rod 304 moves upwardly. The transfer means 295 comprises a plurality of driven belts 305, which are driven from any suitable source (not shown). A cross-shaft 306 mounts a frame structure 307 for pivotal movement. The frame structure 307 supports shafts 308 which in turn support rolls 309. The free end of the frame structure 307 is raised upon energizing of the solenoid of valve means 299, through piston 303, rod 304, and frame structure 307. Then veneer stock on out-bearing conveyor 256 will rise up belts 305 and engage transverse live roll 310 (only the end fragments being shown in Fig. 4) and thence be transferred to the live rolls 311 and thence to any suitable location. The source of power to drive live rolls 310 and 311 is not shown. The piston 303 and parts connected therewith are raised and lowered respectively by air under pressure entering inlet conduit 312 and leaving outlet conduit 313. The piston 303 is held in raised position for a time period sufficient so that the live roll 310 will control the movement of the piece of veneer and insure that such a piece will be delivered to the live rolls 311. When the live roll 310 has control of the piece of veneer stock, then the piston 303 and parts connected therewith will be lowered. Thus, if the next following piece of stock is one which is to be transferred by a subsequent transfer means in the line of travel of the out-bearing conveyor 256, the transfer means 295 will be lowered at a time period and be out of transfer relation as to pieces of veneer stock which it is not to transfer. As the transfer belts 305 work between the belts of the out-bearing conveyor 256, the free end of such belts can be raised or lowered. Also, if a piece of veneer stock is being transferred by the belts 305, the next piece of veneer can travel part way up the belts 305 when they are raised, and then said belts can be moved downwardly (from the dotted line position to the full line position in Fig. 4) before the piece contacts live roll 310. The next following piece will pass under live rolls 310 and 311 and continue to the transfer means which are to transfer the same off the out-bearing conveyor 256.

Each time that the solenoid 76 is energized, a lug will be released and will travel with a wheel 70 which has the groove 279 therein. As each lug passes the switch 287, the switch 287 will be energized sufficiently long to permit transfer of the piece off the conveyor 256. After each transfer, the transfer means 295 is lowered to let the pieces of stock of other sizes move along the out-bearing conveyor until they reach a predetermined and selected transfer means.

The means to control the transfer means 296 is the same as that described in connection with the control of the transfer means 295 except that the same is controlled by a switch 288 which in turn is controlled by lugs in the groove 280. A similar change is true of each subsequent transfer means as 297, and the control means for the transfer means 297 is controlled by the lugs in the groove 281 and the switch 289. It is felt that it would serve no useful purpose in showing the transfer means and the circuits involved which involve switches 290 to 294 inclusive, and hence the same have not been illustrated and described.

As to transfer means 296 and 297, the parts correspond to the parts described in connection with the transfer means 295 and have the numbers and correspond as will be now indicated.

In connection with transfer means 296 and 297, as respects transfer means 295, conductor 314 corresponds to conductor 298; valve means 315 to valve means 299; conductors 316 to conductor 300; conductors 317 to conductor 301.

As previously stated the switches 288 and 289 operate to respectively release lugs 74 in grooves 280 and 281 in response to energizing of solenoids 78 and 80. Also, air cylinders 318 correspond to air cylinder 302; pistons 319 to piston 303; rods 320 to rod 304; belts 321 to belt 305; cross shafts 322 to cross shaft 306; frame structures 323 to frame structure 307; shafts 324 to shaft 308; rolls 325 to rolls 309; live rolls 326 to live roll 310; live rolls 327 to live rolls 311; inlet conduits 328 to inlet conduit 312; and exhaust conduits 329 to exhaust conduit 313. From such corresponding parts and their inherent mode of operation, obviously the transfer means 296 and 297 will be respectively operated each time a lug 74 in grooves 280 and 281 contact respectively switches 288 and 289. The operation of switch 288 will be responsive to solenoids 78 and 80.

The foregoing description of transfer means, which may be employed in connection with the control solenoids 76, 78, 80, and 82 and which are energized each time reset solenoid 62 is energized, obviously are illustrative and may be employed either in connection with the arrangement shown in Fig. 1 of the drawings or in connection with that of Fig. 2 of the drawings.

It will be apparent that a construction such as that described above will operate to advantage when the time required to release the contact arm 42 and return it to its initial position is less than the time required for successive closures of switch 30. However, since the trip chain may travel at speeds of up to 160 feet per minute, it may be desirable to include a plurality of stepping switches in the presently described control device, one of these becoming energized at the time when another is deenergized and returning to its initial position. The stepper switches thus operate alternately and there is no danger of inaccuracy by reason of closure of switch 30 while a stepper switch is returning to its initial position. A construction whereby this is accomplished is illustrated in Figure 2.

In the embodiment of Figure 2, a trip chain indicated generally at 125 carries at spaced intervals, as in the embodiment of Figure 1, a plurality of adjustable index fingers 126. The latter are adjustable laterally with respect to the trip chain and are provided with contact members or feet 127, adapted to contact and actuate when in advanced or operative position the cam bars of the clipper. The index fingers also are adapted to close periodically the switches indicated generally at 130 and 132. These are stationed at suitable positions on the frame of the infeed conveyor and correspond to switches 30 and 32 of Figure 1.

As before, the construction of the stepper switch means may be varied provided it accomplishes the end result of establishing stepwise engagement of a contact member with a plurality of contacts upon the reception by the switch of periodic electric impulses. The stepper switches 134 and 134' of Figure 2 may be identical in construction and may each comprise a plurality of contact points 140, 140' arranged in a circle at spaced intervals. The contact points of both switches may be arranged in groups F, G, H, I, J, and K, L, M, N, O, respectively. The contact points of groups F and K are not connected, while those comprising groups G, H, I, J, and L, M, N, O may be banded together by means of electric conductors to form parts of independent electric circuits.

The electric circuit is completed through the contact points 140, 140' by means of conducting contact arms 142, 142'. These are pivotally mounted by pins 144, 144' and bear at their outer ends fingers 146, 146' which are adapted to engage stops 148, 148'.

Stepwise advancement of the contact arms is accomplished by means of the stepper solenoids 150, 150' acting upon the advancing arms 152, 152' pivotally connected to pins 144, 144' and carrying pawls 154, 154'. The latter engage notched wheels 156, 156'. Hence upon periodic energization of either of the stepper solenoids 150, 150', the corresponding one of notched wheels 156, 156' will be advanced one notch at a time, this movement advancing contact arms 142, 142' one contact at a time, the contact arms being connected to the notched wheels through pins 158, 158'.

After each energization of the stepper solenoids 150, 150', the advancing arms 152, 152' return to their initial position by spring means (not shown). During this process, the notched wheel is maintained in its set position by means of the retaining pawls 160, 160'.

When it is desired to reset the stepper switches by releasing the contact arms 142, 142' and permitting their return to their initial positions under the tension of torsion spring means (not shown) but against which they have been advanced, reset solenoids 162, 162' are energized. This actuates release arms 164, 164' which engage the shank portions of the pawls 154, 160 and 154' and 160', respectively. Upon disengagement of these pawls from their respective notched wheels, the latter return to their initial position carrying with them their respective contact arms which thus are returned to positions at which fingers 146, 146' engage stops 148, 148'.

The individual circuits in which contact unit groups G, H, I, J, and L, M, N, O are incorporated include elements G', H', I', J' of the sorting mechanism. As in the embodiment of Figure 1, these elements correspond to elements operated by solenoids 72, 74, 76 and 78 of the aforesaid patent Evans and Schubert, U. S. 2,497,874. In each element of the sorting mechanism, there is a grooved drum 170 (103), a catch 172 (107), and in the groove a plurality of lugs 174 (106), the parenthetical numerals referring to the corresponding parts of the elements of the said patent.

Solenoids 176, 178, 180, and 182, corresponding respectively to solenoids 72, 74, 76, and 78 of the said patent, are arranged to operate the catch 172, thereby actuating the corresponding elements G', H', I', or J' of the sorter mechanism.

Means also are provided for alternately energizing and deenergizing the stepper switch means 134 and 134'. In the form selected for illustration, such means comprise an impulse relay indicated generally at 185. The relay may be of conventional construction and may comprise a solenoid (not shown) which operates arm 186 through a suitable system of linkages. The action of the impulse relay is such that upon successive energizations of the solenoid thereof the arm 186 oscillates between the positions shown in solid lines and dotted lines. As it moves in this manner, it causes the switch plates 187, 188 to oscillate between corresponding positions. When the switch plates are in the position indicated by solid lines, the stepper switch 134 is energized, whereas when the switch plates are in their dotted line position, the stepper switch 134' is energized.

As the index pins 126 pass in succession the station at which switch 130 is located on the frame of the infeed conveyor, they close this switch through the operation of the arm 136. This closes the circuit so that electric energy from a suitable source passes through line 190, switch 130, line 192, switch plate 187, line 193, stepper solenoid 150, line 194, line 195, and thence to return line 196 via line 197. Therefore, with each closure of switch 130, an electric impulse passes through stepper solenoid 150, energizing the same and causing the stepwise advancement of the contact arm 142 to the next contact.

When a selected index pin has been adjusted inwardly to operative position, it will close switch 132 through the action of the movable arm 138 which contacts the pin. Switch 132 is so arranged that such closure will occur contemporaneously with the closing of switch 130 by a trailing index pin. Current therefore will pass through line 190, switch 130, line 192, line 198, switch 132, line 199, line 200, line 202, and thence through whichever one of solenoids 176, 178, 180, 182 is connected in the circuit to contact arm 142 of stepper switch 134.

If, as is indicated in Figure 2, the contact arm is in contact with one of the contact points of group G, then current from line 202 will pass through solenoid 176, line 203, line 204, the band connecting the contact points of group G, contact arm 142, line 206, line 197, and thence to return line 196. This will result in the actuation of element G' of the sorting mechanism so that the particular piece clipped upon actuation of the clipper knife by the index pin closing switch 132 will be transferred to the appropriate bin. Where the index pins are spaced apart at two-inch intervals, this will be the bin containing pieces having widths of between 8 and 16 inches.

If, however, the contact arm 142 is in engagement with one of the contacts of group H of stepper switch 134 at the time switch 132 is closed by an index pin moved to operative position, then current from line 202 will pass through line 208, solenoid 178, line 209, line 210, the conducting band interconnecting the contact points of group H, contact arm 142, line 206, line 197, and return line 196. This will actuate the element H' of the sorting mechanism so that the clipped piece will be transferred to the corresponding bin which, in the case illustrated, will be the bin containing pieces having widths of between 16 and 30 inches.

If, at the time of closing switch 132 by an index pin adjusted to operative position, the contact arm 142 is in engagement with one of the contact points of group I of stepper switch 134, then current from line 202 will pass through line 212, solenoid 180, line 213, line 214, the connecting band of contact group I, contact arm 142, line 206, line 197, and return line 196. Thereupon the element I' of the sorting mechanism will transfer the cut piece to the bin which in the illustrative case contains pieces having widths of between 30 inches and 42 inches.

If, however, the contact arm 142 is in contact with one of the contacts of group J at the time switch 132 is closed, then current will follow line 202, 216, solenoid 182, lines 217 and 218, the band connected with the contact points of group J, contact arm 142, line 206, line 197, and return line 196. This will actuate the element J' of the sorting mechanism so that the cut piece will be transferred to the bin which, in the case illustrated herein, contains pieces having widths of between 42 inches and 52 inches.

In the event that the contact arm 142 is located in engagement with one of the contact points of group F at the time of closing switch 132, not having progressed sufficiently to have reached the contact points of groups G, H, I or J, then none of the elements of the sorting mechanism will be actuated. As a result, the piece clipped by operation of the knife upon actuation of the latter by the particular index pin which has closed switch 132 will be carried the length of the offbearing conveyor and will pass to scrap.

In addition to energizing one of the solenoids 176, 178, 180, and 182, closing of the switch 132 operates to release stepper switch 134 so that the contact arm thereof is returned to its initial position, i. e., with the finger 146 engaging the stop 148. This is accomplished by energization of the reset relay 162, current from input line 190 passing through switch 130, line 192, line 198, switch 132, line 199, line 219, switch plate 188, line 220, reset solenoid 162, line 222, line 223, line 195, line 197, and return line 196. Upon energizing the reset solenoid 162 in this manner, the pivoted arm 164 releases the pawls 154, 160 from their respective notches in the notched wheel 156, which then is returned by the torsion spring associated therewith to its initial position, carrying with it the attached contact arm 142 in the manner explained hereinabove.

However, since the return of the contact arm 142 to its original position may require a time interval greater than that required for successive index pins to pass switch 130, a second stepper switch also is included in the circuit, together with means for energizing the same and deenergizing the first stepper switch at the time it is returned to its initial position. The contact arm of the second stepper switch then is advanced stepwise with the successive passage of the index pins, the contact arm of the first stepper switch remaining idle for the time being.

Such means comprise, as indicated above, the impulse relay 185. Upon closing switch 132, current passes through line 199, line 200, line 224, through the solenoid of impulse relay 185, through line 226, and thence to return line 196. Energization of the solenoid in impulse relay 185 moves the arm 186 thereof and connected switch plates 187 and 188 to their dotted outline positions. This disconnects stepper switch 134 from the circuit and connects therewith switch 134'. The latter operates in a manner identical with the manner of operation of stepper switch 134. Thus, upon closing switch 130, current from line 190 passes through swich 130, line 192, switch plate 187, line 228, stepper solenoid 150', line 230, line 232, lines 234, 223, 195, 197, and return line 196. This energizes the stepper switch solenoid 150', periodically, thereby advancing stepwise the contact arm 142'.

Upon closing switch 132, one of elements G', H', I', and J' is actuated, depending upon which of the contact point groups L, M, N, and O contains the contact points engaged by contact 142' at the time of closing switch 132. If contact arm 142' is at one of the contact points of group L, then element G' of the sorting mechanism will be activated, the current flowing through switch 132, lines 199, 200, 202, solenoid 176, lines 203 and 236, the band connecting the contact points of group L, contact arm 142', and lines 238, 234, 223, 195, 197 and thus to return line 196.

If the contact arm is at one of the contact points at group M at the time of closing switch 132, then current will flow through switch 132, lines 199, 200, 202, 208, solenoid 178, line 209, line 240, the contact band connecting the contact points of group M, contact arm 142' and lines 236, 234, 223, 195, 197 and return line 196.

If the contact arm is at one of the contact points of group N at the time of closing switch 132, then current from input line 190 will flow through switch 132, and lines 199, 200, 202, 212, solenoid 160, lines 213 and 242, the contact band connecting the contact points of group N, contact arm 142', and lines 236, 234, 223, 195, 197 and return line 196.

If, upon closing switch 132, the contact arm is at one of the contact points of group O, then current flowing through switch 132 will follow lines 199, 200, 202, 215, solenoid 162, lines 217 and 244, the conducting band interconnecting the contact points of group O, contact arm 142', and lines 236, 234, 223, 195, 197 and return line 196.

Thus when stepper switch 134' is employed, one of the elements G', H', I', J' of the sorting mechanism is energized to transfer the cut pieces to bins containing pieces having widths of from 8 to 16 inches, 16 to 30 inches, 30 to 42 inches, and 42 to 52 inches, respectively, depending upon whether the contact arm is at one of the contacts of group L, M, N, or O. If the contact arm is at one of the contacts K, one of the elements of the sorting mechanism is actuated, and the cut piece passes over the end of the offbearing conveyor to scrap.

After a given operation of the stepper switch 134', as determined by closing of switch 132, its contact arm 142' is returned to the initial position in which the finger 146' is adjacent the stop 148'. This is accomplished by means of the reset relay 162'. Upon closing switch 132, current flowing therethrough will follow lines 199, 219, switch plate 188 (in dotted outline position), line 246, reset solenoid 162', lines 248, 232, 234, 223, 195, 197, and return line 196. Energization of this relay releases pawls 154' and 160' through the action of release arm 164', whereupon notched wheel 156' returns to its zero position carrying arm 142' with it.

Contemporaneously with the inactivation of stepper switch 134', stepper switch 134 is reactivated by operation of the impulse relay. This occurs as explained above, current passing through closed switch 132, then following lines 199, 200, 224, through the solenoid of the impulse relay, and thence through line 226 to return line 196. This returns the arm 186 of the impulse relay to its solid line position, thereby returning at the same time the switch plates 187, 188 to their solid line positions. At these positions of the switch plates, the stepper switch 134 is activated and continues the control of the sorting mechanism. In this manner, stepper switches 134 and 134' are energized alternately as switch 132 is closed by succeeding index pins which have been adjusted to operative position.

Although in the above illustrative case the operation of the control device has been described with reference to two stepper switches in circuit together, it will be apparent to one skilled in the art that as many stepper switches may be included in the circuit as are necessary to accomplish the desired result. It will be apparent further that as many elements as are desired may be included in the sorting mechanism. For example, it often is desirable to sort the cut pieces not only according to their width but also according to whether they comprise heart stock or sap stock. In this case, there will be one bin and a corresponding element in the sorting mechanism for heart stock and one for sap stock, for each of the four widths indicated above, thereby making a total of eight bins and eight elements of the sorting mechanism. Such an arrangement is described and illustrated in the aforesaid patent application of Dale L. Schubert, Serial No. 33,050, attention being directed particularly to Figure 5 thereof. It will be apparent from a consideration of this figure that one or a plurality of stepper switches may be used to replace switches 29 to 55, inclusive, thereof in the manner taught herein.

Hence by the present invention, I have provided a simple but accurate device for controlling the operation of a mechanism whereby cut pieces are sorted and transferred to appropriate bins from the offbearing conveyor of a wood veneer clipper or related apparatus. In addition, the device of my invention is reliable in operation, and readily adaptable in multiple units to situations wherein the feed material is passing through the clipper at a very high rate. It is applicable generally, furthermore, to any of the types of clippers wherein the infeed conveyor is provided with a trip chain moving synchronously with the conveyor and having lugs, dogs, index pins or other contact means at spaced intervals and adapted to contact and close suitably stationed electric switches.

It is to be understood that the form of my invention herewith shown and described is to be taken as a preferred example of the same and that various changes in the shape, size, and arrangement of parts may be resorted to without departing from the spirit of my invention or the scope of the subjoined claims.

Having thus described my invention, I claim:

1. In combination in an apparatus of the type described, an in-feeding conveyor, off-bearing sorter means including a plurality of electrically controlled power means for selectively operating said sorter means, a plurality of actuating circuits each connected to control one of said power means and each including an actuating switch, a plurality of time delay devices each arranged to operate one of said actuating switches and each provided with an electro-responsive actuator, an endless movable control member synchronized with said in-feeding conveyor, said control member including a plurality of actuating dogs equally spaced therealong and each selectively movable between an active and an inactive position, a first control switch positioned adjacent said movable control member and arranged to be actuated successively by each of said dogs as said control member is moved, a second control switch positioned adjacent said movable control member and arranged to be actuated successively by only such of said dogs as are in said second position, a resettable stepper switch, means controlled by said first control switch for actuating said stepper switch to count the passage of said dogs, and means controlled by said second control switch for simultaneously resetting said stepper switch and energizing a selected one of the electro-responsive actuators of said time delay devices in accordance with the count of said stepper switch at the time said second control switch is actuated.

2. In combination in an apparatus of the type described, an in-feeding conveyor; off-bearing sorter means including a plurality of electrically controlled power means for selectively operating said sorter means; an endless movable control member arranged beside said in-feeding conveyor and synchronized therewith, said control member including a plurality of actuating elements spaced therealong at equal intervals and each selectively movable between a first position and a second position; a first control switch positioned adjacent said control member and arranged to be successively actuated by each of said actuating elements as said control member is moved; a second control switch positioned adjacent said control member and arranged to be actuated only by such of said actuating elements as have been moved to said second position; stepper switch means including a series of contacts arranged in successive interconnected groups, a movable stepper contact, electro-responsive stepping means for stepping said movable contact successively along said series of contacts, and electro-responsive reset means for returning said movable contact to an initial position; circuit means connecting said first control switch to control said stepping means; circuit means connecting said second control switch to control said reset means; a plurality of actuating circuits each connected to control one of said power means and each including an actuating switch; a plurality of time delay means each arranged to operate one of said actuating switches and each provided with an electro-responsive actuator, and an energizing circuit for each of said electro-responsive actuators, each of said energizing circuits including a different interconnected contact group of said stepper switch means and being completed only when said second control switch is actuated.

3. In combination in an apparatus of the type described, an in-feeding conveyor; off-bearing sorter means including a plurality of electrically controlled power means for selectively operating said sorter means; a plurality of actuating circuits each connected to control one of said power means and each including an actuating switch; a plurality of time delay devices each arranged to operate one of said actuating switches and each provided with an electro-responsive actuator; a movable control member synchronized with said in-feeding conveyor and including a plurality of equally spaced actuating dogs each movable between a first and a second position; a first control switch positioned adjacent said control member and arranged to be actuated successively by each dog of said member as it passes said first control switch; a pair of resettable stepper switches each provided with an electro-responsive stepping device; a stepper energizing circuit including said first control switch and a contactor arranged to selectively connect the circuit to energize either of said stepping devices, the stepper switch so selectively operated functioning to count the number of times said first control switch is actuated and thus the number of dogs of said control member passing said switch; a second control switch positioned adjacent said control member and arranged to be actuated successively by only such of said dogs as are in said second position; means responsive to actuation of said second control switch for simultaneously resetting whichever of said stepper switches is operating at the time of actuation of said second switch and operating said contactor to connect said energizing circuit to energize the stepping device of the other of said stepper switches so that the count of said dogs will not be interrupted by reason of the time required to reset said stepper switches, and means controlled jointly by said second control switch and said stepper switches for selectively energizing the electro-responsive actuators of said time delay devices in accordance with the stepper count at the time said second control switch is actuated.

ROBERT L. SMITH.

References Cited in the file of this patent

UNITED STATES PATENTS

| Number | Name | Date |
|---|---|---|
| 1,868,894 | Glohn | July 26, 1932 |
| 2,194,381 | Cadman | Mar. 19, 1940 |
| 2,227,778 | Fischbach et al. | Jan. 7, 1941 |
| 2,497,874 | Evans et al. | Feb. 21, 1950 |